(12) United States Patent
Chen et al.

(10) Patent No.: US 8,850,689 B2
(45) Date of Patent: Oct. 7, 2014

(54) METHOD FOR MANUFACTURING SWITCHABLE PARTICLE-BASED DISPLAY USING A PRE-FILLING PROCESS

(75) Inventors: Jau-Shiu Chen, Taoyuan Hsien (TW); Rong-Chang Liang, Cupertino, CA (US)

(73) Assignee: Delta Electronics, Inc., Taoyuan Hsien (TW)

( * ) Notice: Subject to any disclaimer, the term of this patent is extended or adjusted under 35 U.S.C. 154(b) by 238 days.

(21) Appl. No.: 13/429,121

(22) Filed: Mar. 23, 2012

(65) Prior Publication Data

US 2013/0247367 A1    Sep. 26, 2013

(51) Int. Cl.
*H01S 4/00*    (2006.01)

(52) U.S. Cl.
USPC ............ 29/592.1; 29/593; 29/825; 435/287.8

(58) Field of Classification Search
USPC ................. 29/592.1, 593, 825; 435/287.8
See application file for complete search history.

(56) References Cited

U.S. PATENT DOCUMENTS 6,713,298 B2 *    3/2004    McDevitt et al. .......... 435/287.8

* cited by examiner

*Primary Examiner* — Carl Arbes
(74) *Attorney, Agent, or Firm* — Muncy, Geissler, Olds & Lowe, P.C.

(57) ABSTRACT

A method for manufacturing a switchable particle-based display is provided, which includes steps of: providing a substrate having a grid structure thereon to define a plurality of cells; providing a template having a plurality of template ribs thereon to define a plurality of compartments corresponding to the plurality of cells; filling a plurality of display particles into the plurality of compartments on the template; transferring the plurality of display particles from the plurality of compartments on the template to the plurality of cells; and removing the template and mounting an opposite substrate over the substrate.

23 Claims, 10 Drawing Sheets

METHOD FOR MANUFACTURING SWITCHABLE PARTICLE-BASED DISPLAY USING A PRE-FILLING PROCESS

BACKGROUND OF THE INVENTION

1. Field of the Invention

This disclosure relates to a method for manufacturing a switchable display.

2. Description of the Related Art

The electrophoretic display (EPD) is a non-emissive device based on an electrophoresis phenomenon influencing charged particles suspended in a liquid solvent or a gaseous medium. An EPD typically comprises a pair of opposing, spaced-apart and plate-like electrodes, with ribs pre-determined at a certain distance between the electrodes. A suspension composed of suspended charged display particles and a dielectric medium is enclosed between the two plates. At least one of the electrodes is transparent such that the state of the charged display particles can be viewed through the transparent electrode. Recently the EPD technology has been improved, wherein the EPD is formed from a plurality of microcups which are formed integrally with one another as portions of a structured two-dimensional array assembly. Each microcup of the array assembly is filled with a suspension or a dispersion of charged display particles in a liquid solvent or a gaseous medium, and then sealed to form an electrophoretic cell. When a voltage difference is imposed between the two electrodes, the charged display particles migrate by attraction to the plate which has opposite polarity to that of the charged display particles. Thus, the changes in the color or shadings display an image through the transparent electrode by selectively charging the microcups of the array assembly on the plates.

The EPD can be a powder type display in which charged display particles of different polarities and contrast colors are suspended in a gaseous medium in the microcups of the array assembly. The powder-type EPD may have advantages of a very fast responsiveness and a broader range of viewing angles than comparable reflection-type LCDs, and may comparatively use less electricity. Moreover, the powder-type EPD may have a very small thickness such that it can solve the problem of image distortion when the display is bent.

FIG. 1A shows a method to fill charged display particles into cells of microcups. The charged display particles are filled into the cells by: setting a substrate 102, on which the cells 104 are formed by means of ribs 106, and scattering the charged display particles 108 from a nozzle 110 above the substrate 102. In this scattering method, the charged display particles 108 will be adsorbed on the top sides of the ribs where are undesired regions to be filled. Controlling an amount of the charged display particles 108 filled in each cell 104 becomes hard because the charged display particles 108 are too light to be precisely controlled. In order to solve this problem, referring to FIG. 1B, a squeegee method has been shown. In this squeegee method, the charged display particles 108 are arranged on the substrate 102 having a plurality of cells 104 and a plate member 112 called a squeegee is moved on the substrate to sweep the charged display particles 108 into the cells 104. However, controlling the amount of the charged display particles 108 filled in each cell 104 is still difficult because the amount of the charged display particles 108 swept into the cells 104 gradually decrease while the plate member 112 is continuously moving. Thus, the resulting EPD device does not have a good enough uniformity of the amount of the charged display particles 108 in each cell 104, which may cause many problems.

Therefore, a method which can fill the charged display particles by an easy process, which can precisely control the amount of the charged display particles filled in each cell to have a good uniformity, is desired.

BRIEF SUMMARY OF THE INVENTION

In view of the foregoing, the disclosure is related to a method for manufacturing a switchable particle-based display.

In one embodiment, a method for manufacturing a switchable particle-based display is provided, which includes steps of: providing a substrate having a grid structure thereon to define a plurality of cells; providing a template having a plurality of template ribs thereon to define a plurality of compartments corresponding to the plurality of cells; filling a plurality of display particles into the plurality of compartments on the template; transferring the plurality of display particles from the plurality of compartments on the template to the plurality of cells; and removing the template and mounting an opposite substrate over the substrate.

In another embodiment, a method for manufacturing a switchable particle-based display is also provided, which includes steps of: providing a substrate having a grid structure thereon to define a plurality of cells; providing a first template having a plurality of first template ribs thereon to define a plurality of first compartments corresponding to a first portion the plurality of cells; providing a second template having a plurality of second template ribs thereon to define a plurality of second compartments corresponding to a second portion the plurality of cells; providing a third template having a plurality of third template ribs thereon to define a plurality of third compartments corresponding to a third portion the plurality of cells; filling display particles of a first color, display particles of a second color, and display particles of a third color into the first compartments, the second compartments, and the third compartments, respectively; transferring display particles of the first color, display particles of the second color, and display particles of the third color to their corresponding portions of the plurality of cells; and removing the first templates, the second templates, and the third templates and mounting an opposite substrate over the substrate.

A detailed description is given in the following embodiments with reference to the accompanying drawings.

BRIEF DESCRIPTION OF THE DRAWINGS

The present disclosure can be further understood by reading the subsequent detailed description and examples with references made to the accompanying drawings, wherein.

DETAILED DESCRIPTION OF THE INVENTION

Figure 1A:
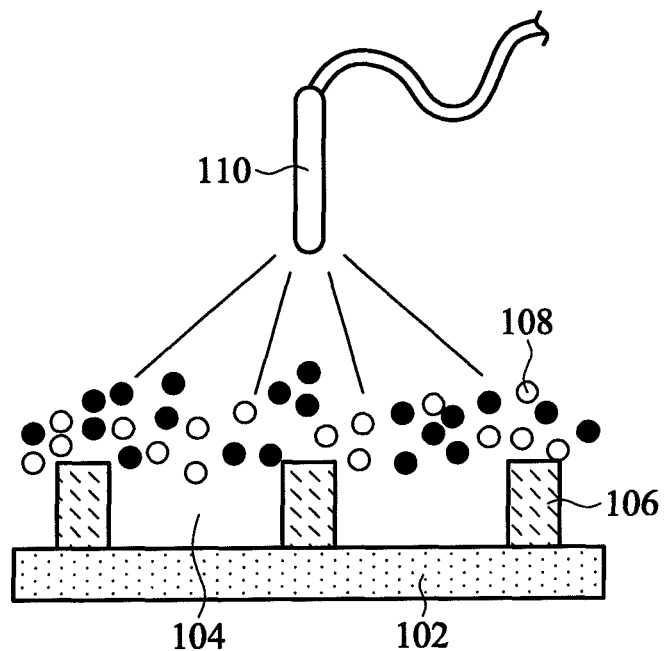
FIGS. 1A and 1B shows a method to fill charged display particles into cells of microcups and a squeegee method in prior art, respectively.
Figure 1B:
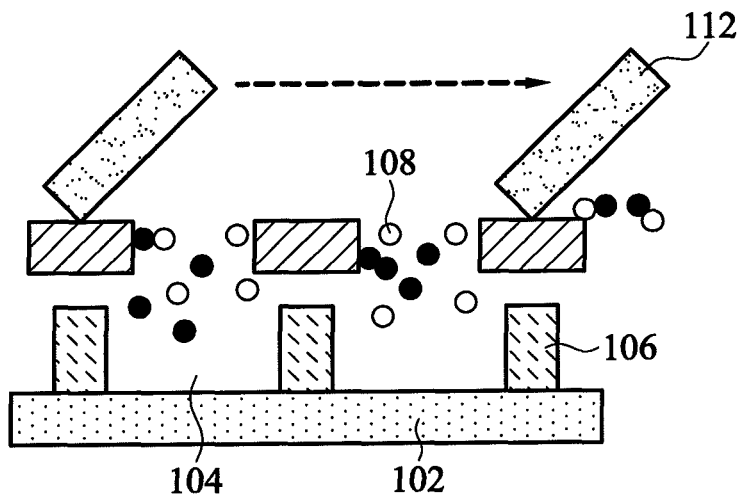

The following description is of the best-contemplated mode of carrying out the disclosure. It is understood that the following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over, above, below, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. The scope of the disclosure is best determined by reference to the appended claims.

The present disclosure provides a method for manufacturing a switchable particle-based display in which a template having compartments is provided to precisely control an amount of the display particles to be filled into each cell of the microcups. The switchable particle-based display may be an EPD device, wherein a powder type EPD having display particles suspended in a gas medium is preferred. The gas medium may be air, $N_2$, or inert gas.

Figure 2A:
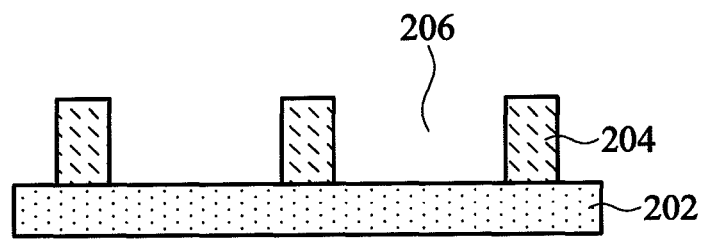
FIGS. 2A~2F show cross-section views of a method for manufacturing a switchable particle-based display at various stages according to an embodiment of the present disclosure.

FIGS. 2A~2D show cross-section views of a method for manufacturing a switchable particle-based display at various stages according to an embodiment of the present disclosure. Referring to FIG. 2A, a substrate 202 having a grid structure thereon is provided. The substrate 202 may be a transparent electrode such as an ITO plate. The grid structure is formed of a plurality of grid ribs 204 which are extended two-dimensionally (to the right/left and in/out of the plane shown in FIG. 2A). The plurality of grid ribs 204 may have a height of between 5 and 150 μm, and may act as partition walls to define a plurality of cells 206 on the substrate 202, and the cells 206 may form a cell array in advance. Thus, each of the plurality of cells 206 may have a first volume determined by the distances between two adjacent grid ribs 204 in two dimensions (to the right/left and in/out of the plane shown in FIG. 2A) and the height of the grid ribs 204. The rib area between the cells 206 is preferably kept small in order to achieve high color saturation and contrast while maintaining desirable mechanical properties. The grid ribs 204 may be prepared by exposure of a radiation curable material coated by known methods onto the substrate to UV light through the mask. The cells 206 may be formed in round, square, rectangular, hexagonal, or any other shapes.

Figure 2B:
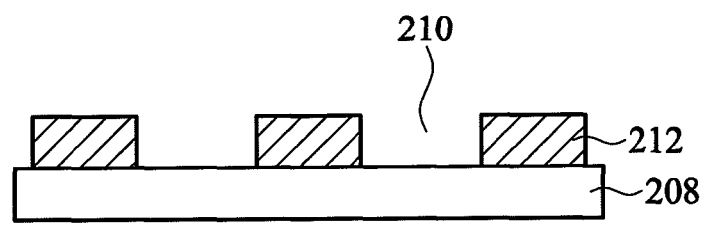

Referring to FIG. 2B, a template 208 having a plurality of compartments 210 corresponding to the plurality of cells 206 formed thereon is provided for pre-filling display particles therein. The compartments 210 may be defined by a plurality of template ribs 212 which are extended two-dimensionally (to the right/left and in/out of the plane shown in FIG. 2B) on the template 208. The plurality of template ribs 212 may act as partition walls to define the plurality of compartments 210 corresponding to the plurality of cells 206. Therefore, the compartments 210 may have a second volume determined by the distances between two adjacent template ribs 212 in theses two dimensions and the height of the template ribs 212. Each of the plurality of compartments 210 may have a substantially same volume to one another. In an embodiment, the second volume of the compartment 210 on the template 208 may be less than 90% of the first volume of the cell 206 on the substrate 202. In another embodiment, the opening sectional area of the cell 206 may be smaller than that of the compartment 210. The template 208 may be a solid substrate, such as a metal mask, a shadow mask, a screen or the combination thereof, which may be integrally formed with the template ribs 212 for providing better mechanical properties. For example, the template 208 and the template ribs 212 may be formed by press molding, photolithography or other suitable process.

Figure 2C:
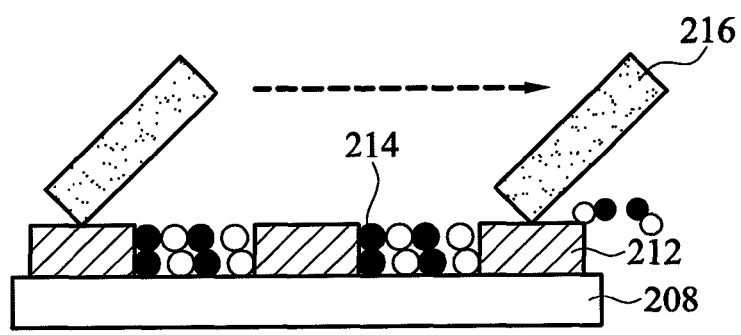

Referring to FIG. 2C, a pre-filling process of filling display particles 214 into the plurality of compartments 210 is performed. The display particles 214 may be filled into the compartments 210 using a squeegee 216 which is a plate-like member such as a plate-like rubber or a plate-like resin. The squeegee 216 may be moved one time on the substrate 208 in a direction from one end of the template (for example, from the left end of the template 208 shown in FIG. 2C) or a plurality times to sweep the display particles 214 into the compartments 210. The amount of the display particles 214 filled in each compartment 210 can be precisely controlled because the second volume of the compartment 210 is far less than the first volume of the cell 206 such that the compartments 210 can be fully filled with the display particles 214. In other words, the amount of the display particles 214 filled into the cells 206 on the substrate 202 may be precisely measured and controlled by the pre-filling process. Note that although the amount of the display particles 214 swept into the compartments 210 are gradually decreased while the squeegee is continuously moving, the decrease of the amount of the display particles 214 can be neglected since all the compartments 210 are fully filled. Also, the squeegee 216 may be moved in an opposite direction from opposite end of the template 208 (for example, from the right end of the template to the left end shown in FIG. 2C) after the first squeegee 216 is moved, to assure that all the compartments 210 are fully filled with the display particles 214. The template 208 may have a smooth surface to avoid display particles 214 being stuck in the defects on the top surfaces of the template ribs 212.

Moreover, display particles 214 having different characteristics, such as having different colors and/or opposite charges, may be filled into the compartments 210 in sequence process. The first type display particles can be filled into a first portion of the compartments, and the second type display particles can be filled into a second portion of the compartments thereafter. For example, in the case of display particles having black and white display particles with opposite charges being filled into the compartments, the black display particles with a first charge characteristic, for example a negative charge, can be filled into the first portion of the compartments, and the white display particles with a second charge characteristic, for example a positive or zero charge, can be filled into the second portion of the compartments thereafter, or vice versa. Also, more times of the filling steps can also be performed by using different templates, and which will be discussed later (referring to FIGS. 5A~5D).

Figure 2D:
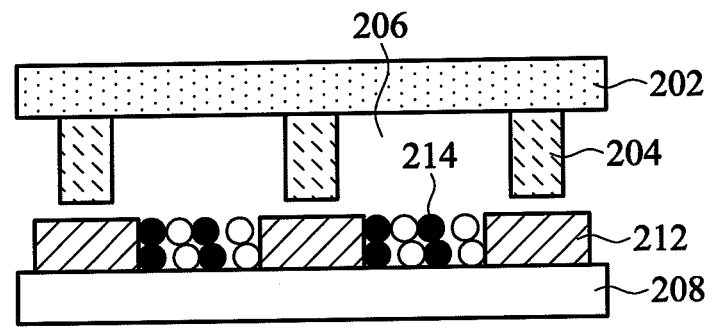
Figure 2E:
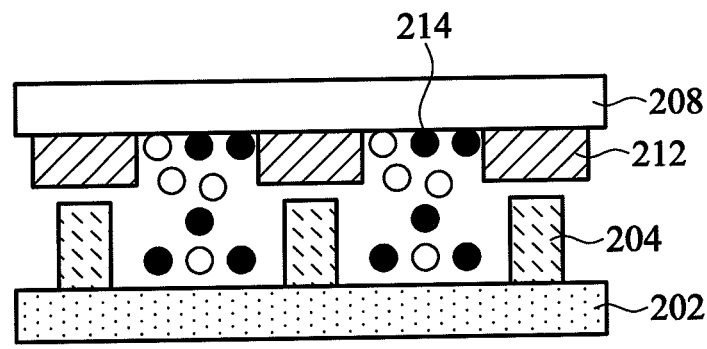

Referring to FIG. 2D, the substrate 202 is mounted onto the template 208 using the grid ribs 204 such that each cell 206 is registered to one or more compartments 210 for transferring of the display particles 214 from the compartments 210 into the cell 206. It should be noted that although one cell 206 is only registered to one compartment 210 in FIG. 2D, one cell may be registered to two or more compartments which have a total volume of less than 90% of the volume of one cell. The cells 206 may be registered to one or more compartments 210 by aligning the grid ribs 204 on the substrate 202 to the template rib 212 on the template 208. In an embodiment, a rib area defined by the template ribs 212 between the compartments 210 may be larger than that defined by the grid ribs 204 between the cells 206 to provide better misalignment tolerance. Then, referring to FIG. 2E, the substrate 202 and the template 208 may be flipped such that the display particles 214 are transferred from the compartments 210 to the corresponding cells 206 by gravity. In addition, a field may be applied to drive the display particles 214 to move from the compartments 210 into the corresponding cells 206. For example, the field may be an electric field, a magnetic field, or the combination thereof. An inspection of the uniformity of the display particles 214 filled in each compartment 210 may be performed subsequent to the filling of the display particles 214 into each compartment 210. Then, the template 208 with the template ribs 212 may be removed after the transfer of the display particles 214 is done.

Figure 2F:
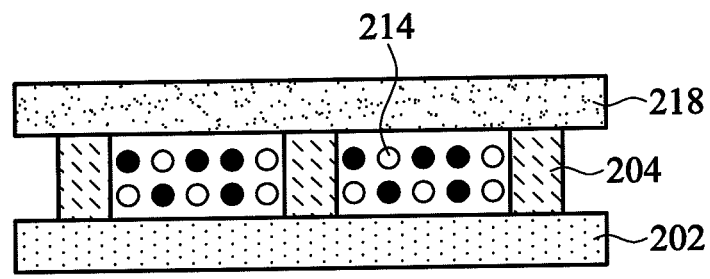

Finally, referring to FIG. 2F, an opposite substrate 218 may be mounted on the top of the grid ribs 204 of the substrate 202 to form the switchable particle-based display. A plurality of microcups comprising the display particles 214 suspended therein may be formed between the grid ribs 204, the substrate 202, and the opposite substrate 218. The opposite substrate 218 may be a transparent electrode such as an ITO plate. Uniformity of the amount of the display particles 214 filled in each of the microcups of the switchable particle-based display may be significantly improved since a pre-filling process is used.

Figure 3A:
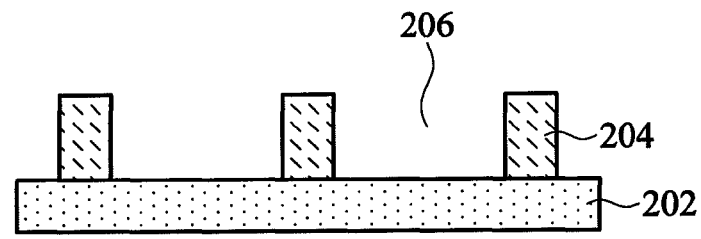
FIGS. 3A~3F show cross-section views of a method for manufacturing a switchable particle-based display at various stages according to another embodiment of the present disclosure.
Figure 3B:
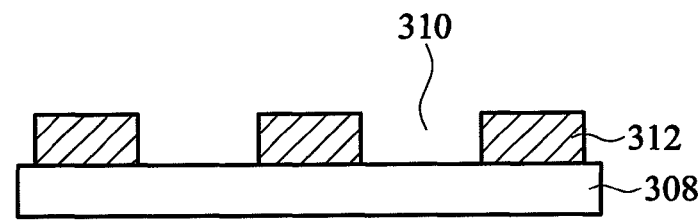

FIGS. 3A~3F show cross-section views of a method for manufacturing a switchable particle-based display at various stages according to another embodiment of the present disclosure. In this embodiment, same reference numbers mean same or similar materials or formation methods as described in the above embodiments. Referring to FIGS. 3A and 3B, a substrate 202 and a template 308 are provided. The substrate 202 may have a grid structure thereon, the grid structure may have a plurality of grid ribs 204 to define a plurality of cells 206, and each of the cells 206 may have a substantially same first volume. The template 308 may have a surface where having a plurality of template ribs 312 thereon to define a plurality of compartments 310 corresponding to the plurality of cells 206. Each of the compartments 310 may have a substantially same second volume which is determined by the distances between two adjacent template ribs 312 and is less than 90% of the first volume of the cell 206. The template 308 may be a metal plate, a ceramic plate, or plastic mask, which may be moveable and can be separated from the template ribs 312. The template ribs 312 may be prepared by exposure of a radiation curable material coated by known methods onto the substrate to UV light through a patterned photomask.

Figure 3C:
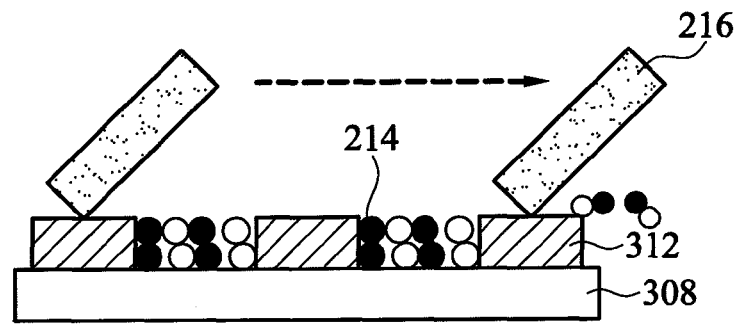
Figure 3D:
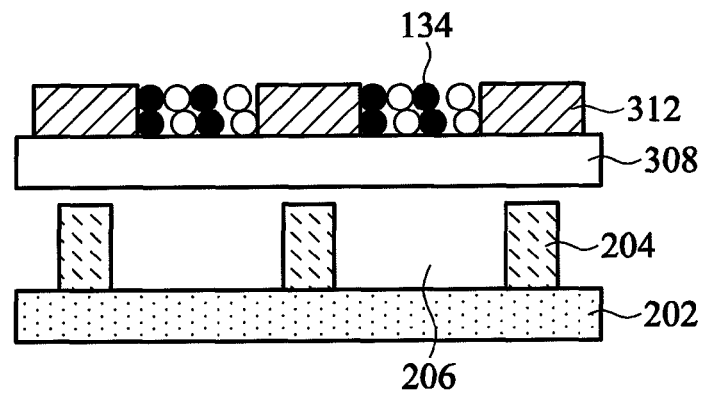
Figure 3E:
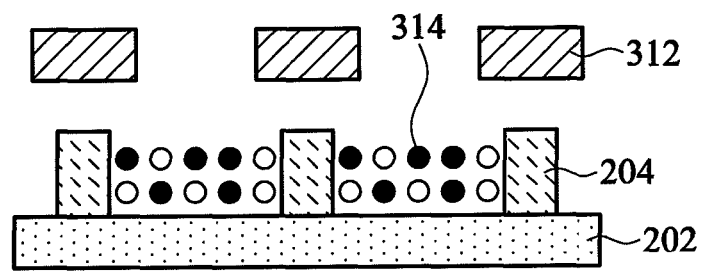

Referring to FIG. 3C, a pre-filling process of sweeping the display particles 214 into the compartments 310 on the template 308 using a squeegee 216 operation may be performed so that the compartments 310 are fully filled by the display particles 214. Then, referring to FIG. 3D, the substrate 202 may be mounted beneath the template 308 from its back surface by aligning the grid ribs 204 on the substrate 202 to the template ribs 312 on the template 308. It should be noted that although one cell 206 is only registered to one compartment 310 in FIG. 3D, one cell may also be registered to two or more compartments which have a total volume of less than 90% of the volume of the one cell. Then, referring to FIG. 3E, the template 308 may be removed horizontally by slipping it away such that the display particles 214 can be directly filled from the compartments 310 into the corresponding cells 206 by gravity. In addition, a field may be applied to drive the display particles 214 to move from the compartments 310 into the corresponding cells 206. For example, the field may be an electric field, a magnetic field, or the combination thereof. An inspection of the uniformity of the display particles 214 filled in each compartment 310 may be performed subsequent to the filling of the particles into each compartment. The remaining template ribs 312 may be removed after the transfer of the display particles 214 is done.

Figure 3F:
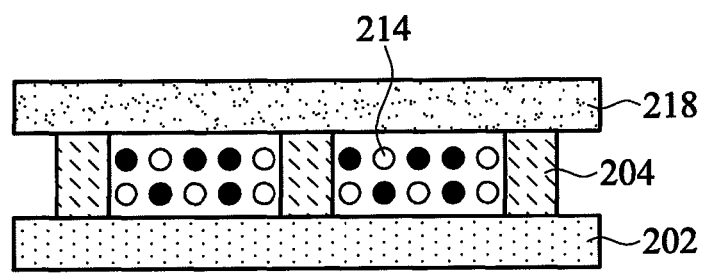

Referring to FIG. 3F, an opposite electrode substrate 218 is mounted on the top of the grid ribs 204 of the substrate 202 to form the switchable particle-based display. A plurality of microcups comprising the display particles 214 suspended therein may be formed between the grid ribs 204, the substrate 202, and the opposite substrate 218. The opposite substrate 218 may be a transparent electrode such as an ITO plate. Uniformity of the amount of the display particles 214 filled in each of the microcups of the switchable particle-based display may be significantly improved since a pre-filling process is used.

Figure 4A:
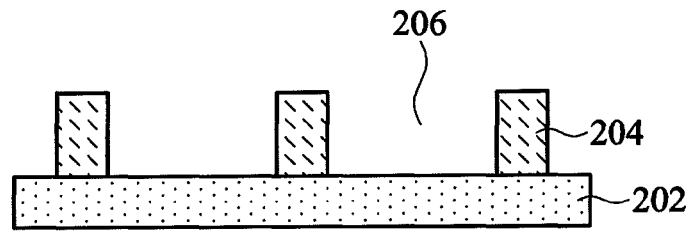
FIGS. 4A~4G show cross-section views of a method for manufacturing a switchable particle-based display at various stages according to yet another embodiment of the present disclosure.
Figure 4B:
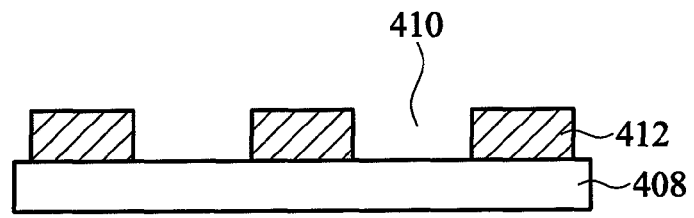

FIGS. 4A~4G show cross-section views of a method for manufacturing a switchable particle-based display at various stages according to yet another embodiment of the present disclosure. In this embodiment, same reference numbers mean same or similar materials or formation methods as described in the above embodiments. Referring to FIGS. 4A and 4B, a substrate 202 and a template 408 are provided. The substrate 202 may have a rib structure thereon, the grid structure may have a plurality of grid ribs 204 to define a plurality of cells 206, and each of the cells 206 may have a substantially same first volume. The template 408 may have a plurality of template ribs 412 thereon to define a plurality of compartments 410 corresponding to the plurality of cells 206. Each of the compartments 410 may have a substantially same second volume which is determined by the distances between two adjacent template ribs 412 and is less than 90% of the first volume of the cell 206. The template 408 may be a metal plate, a ceramic plate, or plastic mask, which may be moveable and can be separated from the template ribs 412. In addition, the template 408 may have an alignment mark such that template ribs 412 can be aligned to desired positions when forming the template ribs 412 on the template 408. The template ribs 412 may be prepared by exposure of a radiation curable material coated by known methods onto the substrate to UV light through a patterned photomask.

Figure 4C:
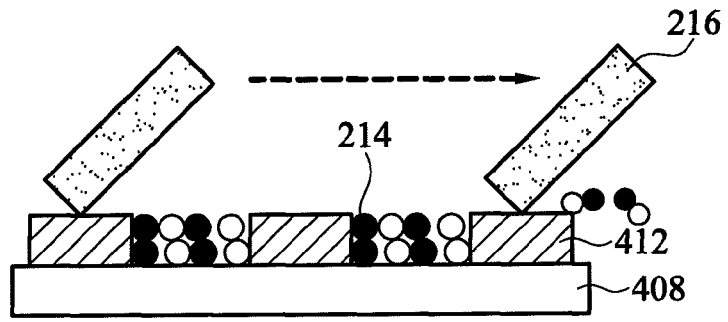
Figure 4D:
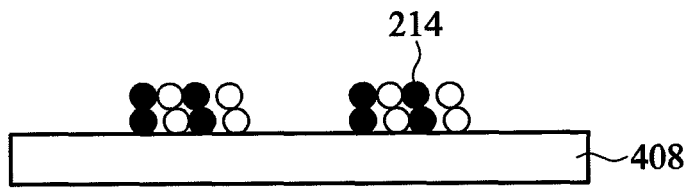

Referring to FIG. 4C, a pre-filling process of sweeping the display particles 214 into the compartments 410 on the template 408 using a squeegee 216 operation may be performed so that the compartments 410 are fully filled by the display particles 214. Then, referring to FIG. 4D, the template ribs 412 may be vertically removed from the template 408 such that the display particles 214 may be held at their original positions on the template 408. In addition, an electric field or a magnetic field, or the combination may be also applied to the template 408 to help the display particles 214 to be held at their original positions.

Figure 4E:
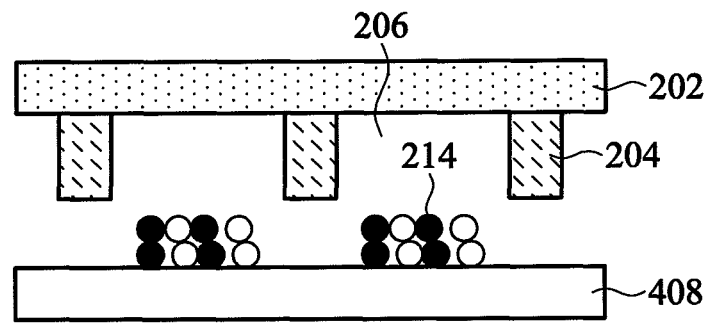

Referring to FIG. 4E, the substrate 202 is mounted onto the template 408 by using the grid ribs 204 to be aligned to an alignment mark on the template 408 such that each of the cells 206 is registered to one or more compartments 210 for transferring the display particles 214 from the compartments 410 into the corresponding cells 206. It should be noted that although one cell 206 is only registered to one compartment 310 in FIG. 4E, one cell may also be registered to two or more compartments which have a total volume of less than 90% of the volume of the one cell. In an embodiment, a rib area defined by the template ribs 412 between the compartments 410 may be larger than that defined by the grid ribs 204 between the cells 206 to provide better misalignment tolerance.

Figure 4F:
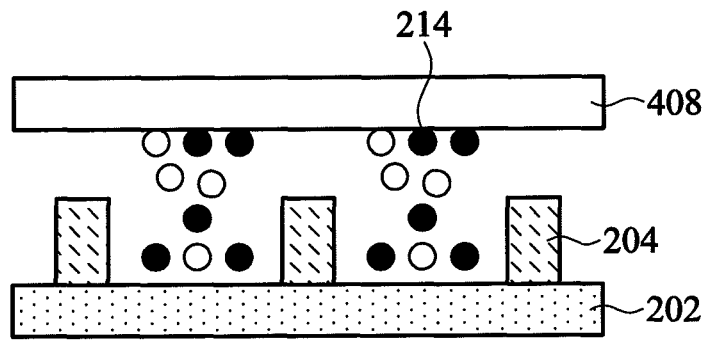

Then, referring to FIG. 4F, the substrate 202 and the template 408 may be flipped such that the display particles 214 can be directly transferred from the compartments 410 into the corresponding cells 206 by gravity. In addition, a field may be applied to drive the display particles 214 to move from the compartments 410 into the corresponding cells 206. For example, the field may be an electric field, a magnetic field, or the combination thereof. An inspection of the uniformity of the display particles 214 filled in each compartment 410 may be performed subsequent to the filling of the display particles 214 into each compartment 410. The template 408 with the template ribs 212 can be removed after the transfer of the display particles 214.

Figure 4G:
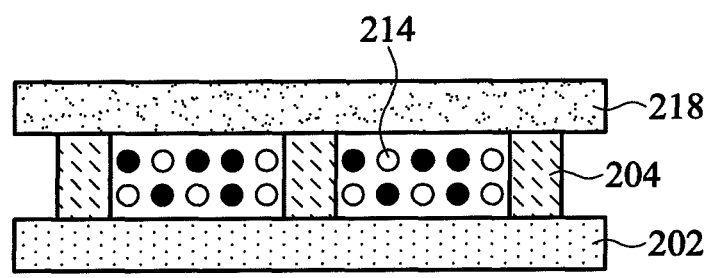

Referring to FIG. 4G, an opposite substrate 218 is mounted onto the top of the grid ribs 204 of the substrate 202 to form the switchable particle-based display. A plurality of microcups may be formed between the grid ribs 204, the substrate 202, and the opposite substrate 218. The opposite substrate 218 may be a transparent electrode such as an ITO plate. Uniformity of the amount of the display particles 214 filled in each of the microcups of the switchable particle-based display may be significantly improved since a pre-filling process is performed.

In the case of the display particles having three colors which need to be filled into the cells, the pre-filling step shown in the FIGS. 2C, 3C and 4C may need to be performed three times to fill the display particles 214 of respective colors of R, G, B, for example. However, if only one template with many times of squeegee operations is performed, display particles of different colors may be mixed in the compartments and/or cells. Thus, it is preferred to perform squeegee operations on different templates respectively to different display particles.

Figure 5A:
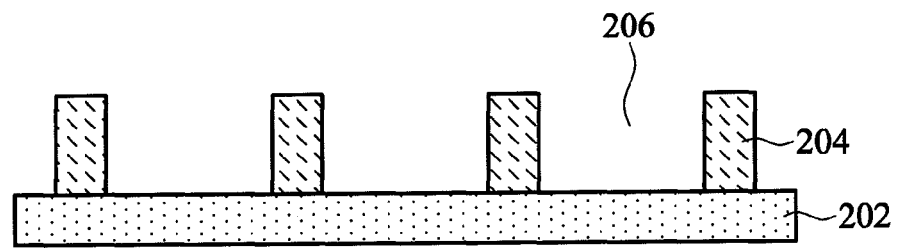
FIGS. 5A~5E show cross-section views of a method for manufacturing a switchable particle-based display at various stages according to still another embodiment of the present disclosure.
Figure 5B:
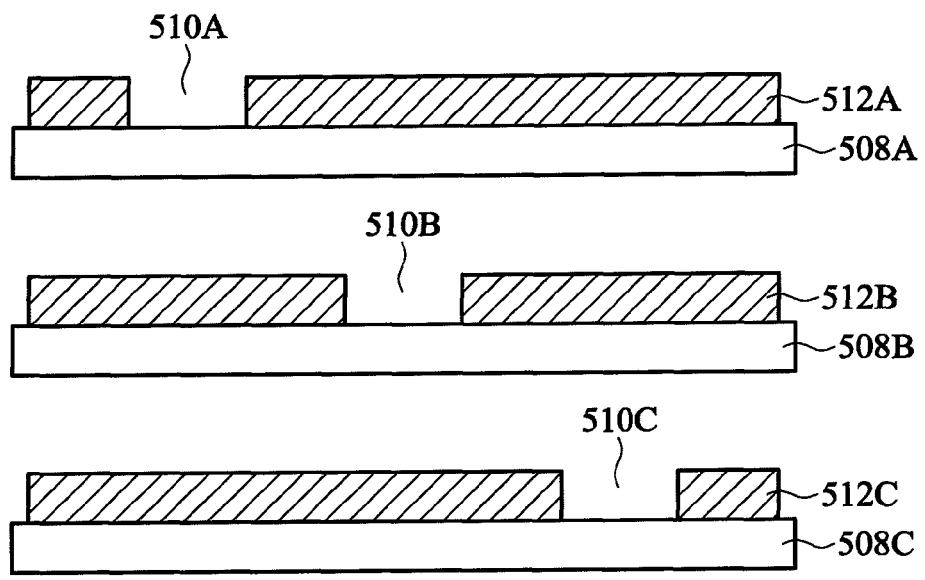

For example, FIGS. 5A~5E show cross-section views of a method for manufacturing a switchable particle-based display at various stages according to still an embodiment of the present disclosure. In this embodiment, same reference numbers mean same or similar materials or formation methods as described in the above embodiments. Referring to FIGS. 5A and 5B, a substrate 202 and three templates 508A, 508B, and 508C are provided. The substrate 202 may have a grid structure thereon, the grid structure may have a plurality of grid ribs 204 to define a plurality of cells 206, and each of the cells may have a substantially same first volume. The three templates 508A, 508B, and 508C may have a plurality of template ribs 512A, 512B, and 512C thereon, respectively. Each of the template ribs 512A, 512B, and 512C may have different patterns to define a plurality of compartments 510A, 510B, and 510C, respectively. The volume of each of the compartments 510A, 510B, and 510C may be substantially the same, and is less than 90% of the volume of the cell 206. The templates 508A, 508B, and 508C may be integrally formed with the template ribs 512A, 512B, and 512C, or may be separately formed.

Figure 5C:
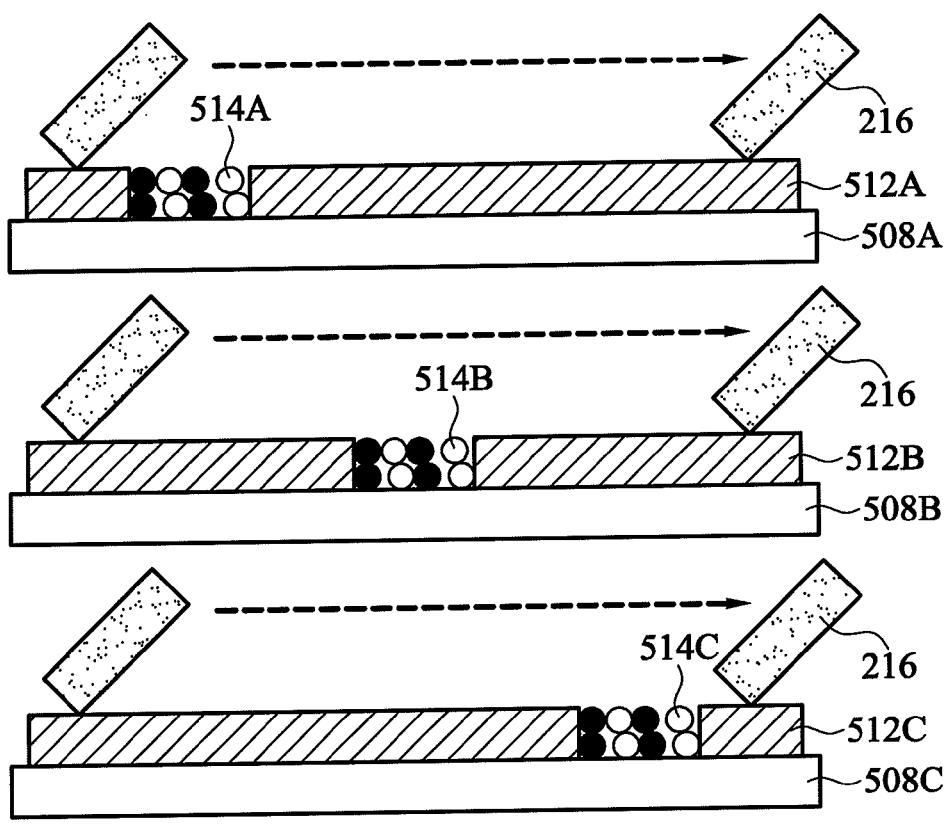

Then, referring to the FIG. 5C, a pre-filling process of red and white display particles 514A with opposite charges may be filled into the compartments 508A on the template 308A using the squeegee 216 operation described above. Green and white display particles 514B with opposite charges may be filled into the compartments 510B on the template 508B using the squeegee 216 operation described above. Blue and white display particles 514C with opposite charges may be filled into the compartments 510C on the template 508C using the squeegee 216 operation described above.

Figure 5D:
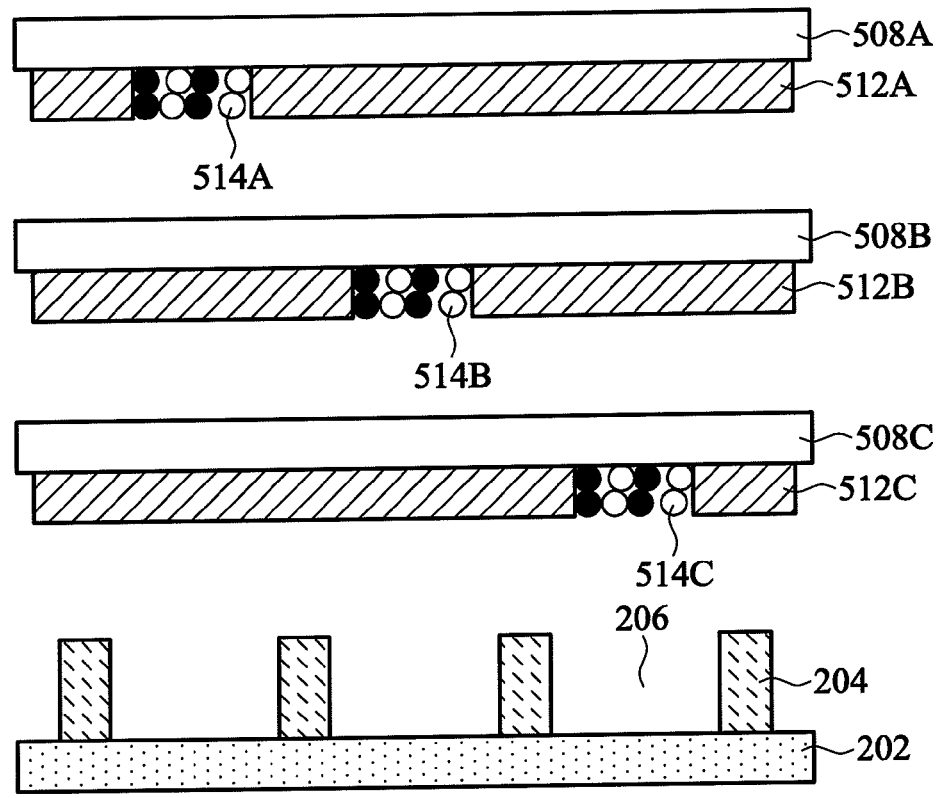

Referring to FIGS. 5D, the compartments 508A filled with red and white display particles 512A, the compartments 508B filled with green and white display particles 512B, and the compartments 508C filled with blue and white display particles 512C may be aligned to their corresponding portions of the cells 206, respectively, as shown in FIG. 5D, and transferred the display particles 514A, 514B, and 514C thereto in sequence or simultaneously. The display particles 514A, 514B, and 514C may be transferred into the cells 206 using methods described in any embodiments disclosed in this description. The templates 508A, 508B, and 508C and the template ribs 512A, 512B, and 512C may be removed after the transfer of the display particles 514A, 514B, and 514C is done.

Figure 5E:
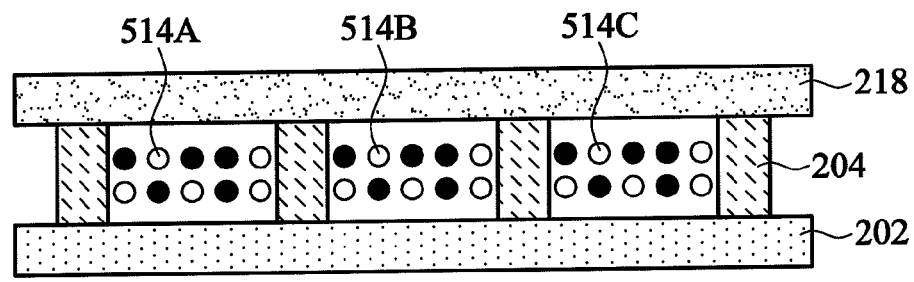

Referring to FIG. 5E, an opposite substrate 218 is mounted onto the top of the grid ribs 204 of the substrate 202 to form the colorful switchable particle-based display. A plurality of microcups may be formed between the grid ribs 204, the substrate 202, and the opposite substrate 218. The opposite substrate 218 may be a transparent electrode such as an ITO plate. Uniformity of the amount of the display particles 514A, 514B, and 514C filled in each of the microcups of the switchable particle-based display may be significantly improved since a pre-filling process is used.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing a switchable particle-based display, comprising steps of:
   providing a substrate having a grid structure thereon to define a plurality of cells;
   providing a template having a plurality of template ribs thereon to define a plurality of compartments corresponding to the plurality of cells;
   filling a plurality of display particles into the plurality of compartments on the template;
   transferring the plurality of display particles from the plurality of compartments on the template to the plurality of cells; and
   removing the template and mounting an opposite substrate over the substrate.

2. The method of claim 1, wherein the step of transferring the display particles to the plurality of cells comprises:
   mounting the substrate onto the template such that each of the cells is registered to one or more corresponding compartments; and
   flipping the template and the substrate to move the display particles in the plurality of compartments on the template into the plurality of cells.

3. The method of claim 2, wherein the move of the display particles is driven by gravity, an electric field, a magnetic field or the combination thereof.

4. The method of claim 1, wherein the template is capable of separating from the template ribs, and wherein the step of transferring the display particles to the plurality of cells comprises:

mounting the substrate beneath the template; and removing the template so as to allow the display particles in the plurality of compartments to move into the plurality of cells.

5. The method of claim 4, wherein the move of the display particles is driven by gravity, an electric field, a magnetic field, or the combination thereof.

6. The method of claim 1, wherein the step of transferring the display particles to the plurality of cells comprises:

removing the template ribs with holding the display particles at their original positions;

mounting the substrate onto the template by aligning the grid structure to the original position of the template ribs; and flipping the template and the substrate to move the display particles on the template into the plurality of cells.

7. The method of claim 6, wherein the move of the display particles is driven by gravity, an electric field, a magnetic field or the combination thereof.

8. The method of claim 1, wherein the step of transferring the display particles to the plurality of cells comprises applying a field to drive the display particles to move into the plurality of cells.

9. The method of claim 1, further comprising inspecting distribution uniformity of the display particles filled in each compartment subsequent to the step of filling of the display particles into each compartment on the template.

10. The method of claim 1, wherein the step of filling the plurality of display particles into the plurality of compartments on the template comprises steps of:

filling a first part of the display particles into each of the plurality of compartments; and filling a second part of the display particles into remaining spaces of each of the plurality of compartments.

11. The method of claim 1, wherein the step of filling the plurality of display particles into the plurality of compartments on the template comprises steps of:

filling a first part of the display particles into a first portion of the plurality of compartments; and filling a second part of the display particles into a second portion of the plurality of compartments.

12. The method of claim 1, wherein each of the plurality of compartments has a substantially same volume to each other.

13. The method of claim 1, wherein all of the plurality of compartments are fully filled by the plurality of display particles in the step of filling the plurality of display particles into the plurality of compartments on the template.

14. The method of claim 1, wherein each of the plurality of cells has a first volume, each of the plurality of compartments has a second volume, and the second volume is less than 90% of the first volume.

15. The method of claim 14, wherein the amount of display particles filled in each of the plurality of cells is determined by the second volume.

16. The method of claim 1, wherein the step of filling the plurality of display particles into the plurality of compartments on the template is achieved by using a squeegee operation.

17. The method of claim 1, wherein the template comprises an alignment mark.

18. The method of claim 1, wherein the template and the template ribs are integrally formed.

19. A method for manufacturing a switchable particle-based display, comprising steps of:

providing a substrate having a grid structure thereon to define a plurality of cells;

providing a first template having a plurality of first template ribs thereon to define a plurality of first compartments corresponding to a first portion the plurality of cells;

providing a second template having a plurality of second template ribs thereon to define a plurality of second compartments corresponding to a second portion the plurality of cells;

providing a third template having a plurality of third template ribs thereon to define a plurality of third compartments corresponding to a third portion the plurality of cells filling display particles of a first color, display particles of a second color, and display particles of a third color into the first compartments, the second compartments, and the third compartments, respectively;

transferring display particles of the first color, display particles of the second color, and display particles of the third color into their corresponding portions of the plurality of cells; and removing the first templates, the second templates, and the third templates, and mounting an opposite substrate over the substrate.

20. The method of claim 19, wherein display particles of the first color, display particles of the second color, and display particles of the third color are transferred into their corresponding portions of the plurality of cells in sequence.

21. The method of claim 19, wherein each of the first compartments, the second compartments, and the third compartments has a substantially same volume.

22. The method of claim 19, wherein the volume of each of the first compartments, the second compartments, and the third compartments is less than 90% of the volume of each corresponding cell.

23. The method of claim 19, wherein the method of transferring display particles is driven by gravity, an electric field, a magnetic field or the combination thereof.

* * * * *